(12) United States Patent
Mayfield et al.

(10) Patent No.: US 8,702,151 B2
(45) Date of Patent: Apr. 22, 2014

(54) TONNEAU COVER SYSTEM FOR A PICKUP TRUCK BED

(75) Inventors: Christopher Joseph Mayfield, Canton, MI (US); Bradley R. Garska, Saline, MI (US)

(73) Assignee: Specialty Vehicle Acquisition Corporation, Warren, MI (US)

( * ) Notice: Subject to any disclaimer, the term of this patent is extended or adjusted under 35 U.S.C. 154(b) by 49 days.

(21) Appl. No.: 13/537,897

(22) Filed: Jun. 29, 2012

(65) Prior Publication Data

US 2013/0341958 A1 Dec. 26, 2013

Related U.S. Application Data

(60) Provisional application No. 61/663,298, filed on Jun. 22, 2012.

(51) Int. Cl.
 *B60P 7/04* (2006.01)
(52) U.S. Cl.
 USPC ............ 296/100.18; 296/100.15; 296/100.16; 296/100.17
(58) Field of Classification Search
 USPC ............ 296/100.01, 100.15–100.18, 136.03, 296/136.1, 136.12
 See application file for complete search history.

(56) References Cited

U.S. PATENT DOCUMENTS

| | | | |
|---|---|---|---|
| 4,221,423 A | 9/1980 | Stone | |
| 4,747,441 A | 5/1988 | Apolzer et al. | |
| 5,251,951 A * | 10/1993 | Wheatley | 296/100.15 |
| 5,263,761 A * | 11/1993 | Hathaway et al. | 296/100.18 |
| 5,427,428 A | 6/1995 | Ericson et al. | |
| 5,526,866 A * | 6/1996 | Flentge | 160/380 |
| 5,636,893 A | 6/1997 | Wheatley et al. | |
| 5,788,315 A * | 8/1998 | Tucker | 296/100.16 |
| 6,257,306 B1 * | 7/2001 | Weldy | 160/327 |
| 6,293,608 B1 * | 9/2001 | Dicke et al. | 296/100.15 |
| 6,309,006 B1 * | 10/2001 | Rippberger | 296/100.16 |
| 6,322,129 B2 * | 11/2001 | Huotari | 296/100.15 |
| 6,607,234 B1 * | 8/2003 | Schmeichel | 296/100.16 |
| 6,752,449 B1 | 6/2004 | Wheatley | |
| 6,808,221 B2 | 10/2004 | Wheatley | |
| 6,893,073 B2 | 5/2005 | Wheatley | |
| 6,948,760 B2 | 9/2005 | Marx et al. | |
| 7,004,530 B2 | 2/2006 | Marx et al. | |
| 7,021,693 B2 | 4/2006 | Keller | |
| 7,051,781 B2 | 5/2006 | Grimm et al. | |
| 7,066,523 B2 | 6/2006 | Verduci et al. | |
| 7,114,769 B2 | 10/2006 | Storc et al. | |
| 7,163,260 B2 | 1/2007 | Reitzloff et al. | |
| 7,188,888 B2 | 3/2007 | Wheatley et al. | |
| 7,303,227 B2 | 12/2007 | Reitzloff et al. | |
| 7,334,830 B2 | 2/2008 | Weldy | |
| 7,399,030 B2 | 7/2008 | Reitzloff et al. | |
| RE41,078 E | 1/2010 | Schmeichel | |
| 7,938,483 B2 | 5/2011 | Reitzloff et al. | |
| 8,061,758 B2 | 11/2011 | Maimin et al. | |
| 8,146,981 B2 * | 4/2012 | Huotari et al. | 296/100.15 |
| 2008/0129077 A1 | 6/2008 | Weldy | |

* cited by examiner

*Primary Examiner* — Glenn Dayoan
*Assistant Examiner* — Gregory Blankenship
(74) *Attorney, Agent, or Firm* — Harness, Dickey & Pierce, P.L.C.

(57) ABSTRACT

A tonneau cover system for a pickup truck bed includes an adjustable corner bracket assembly. The corner bracket assembly includes a pivotally connected lower bracket member, upper bracket member, and cap member. The upper and lower bracket members are movable between an acute rail configuration and an obtuse rail configuration.

39 Claims, 9 Drawing Sheets

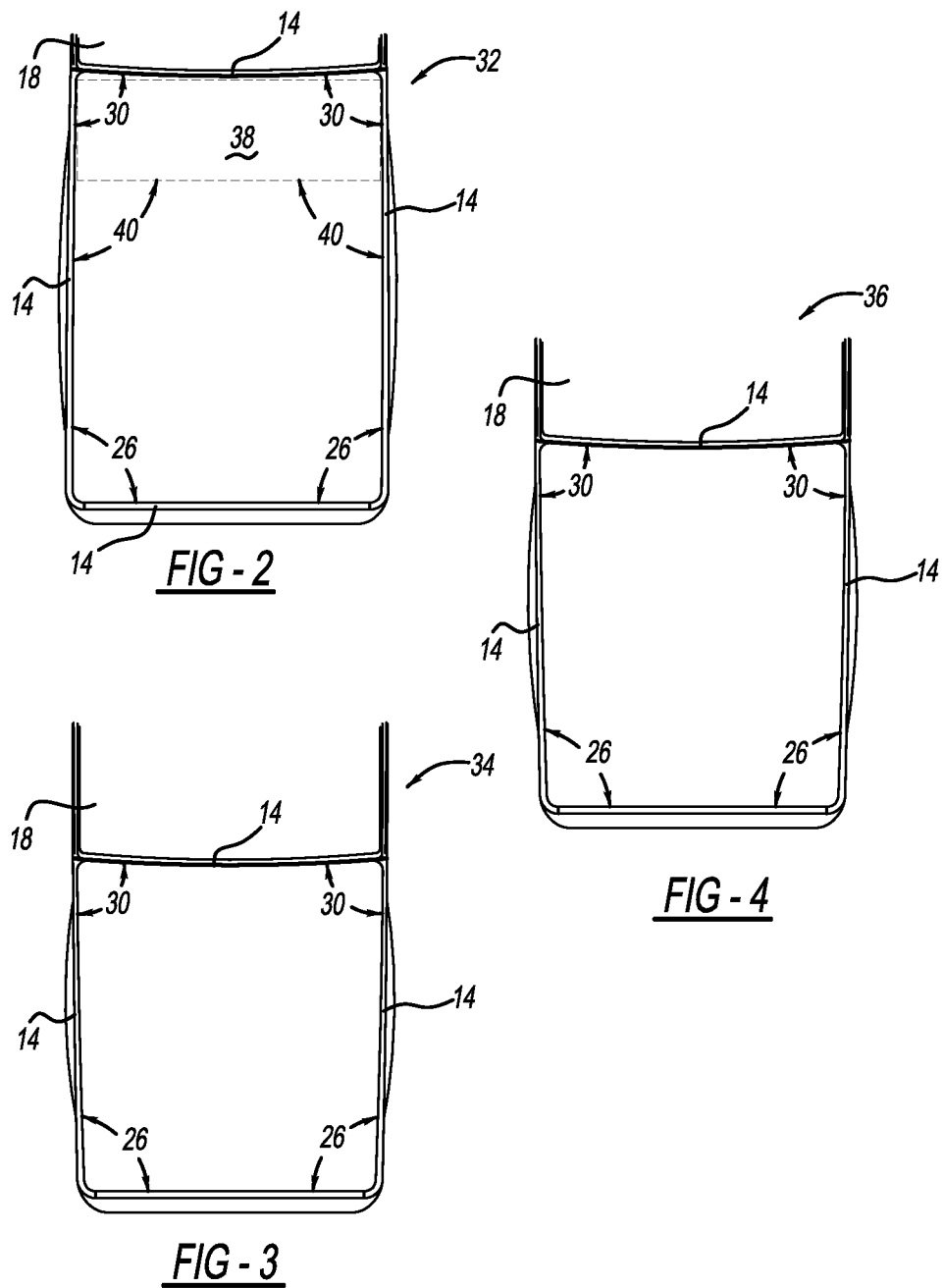

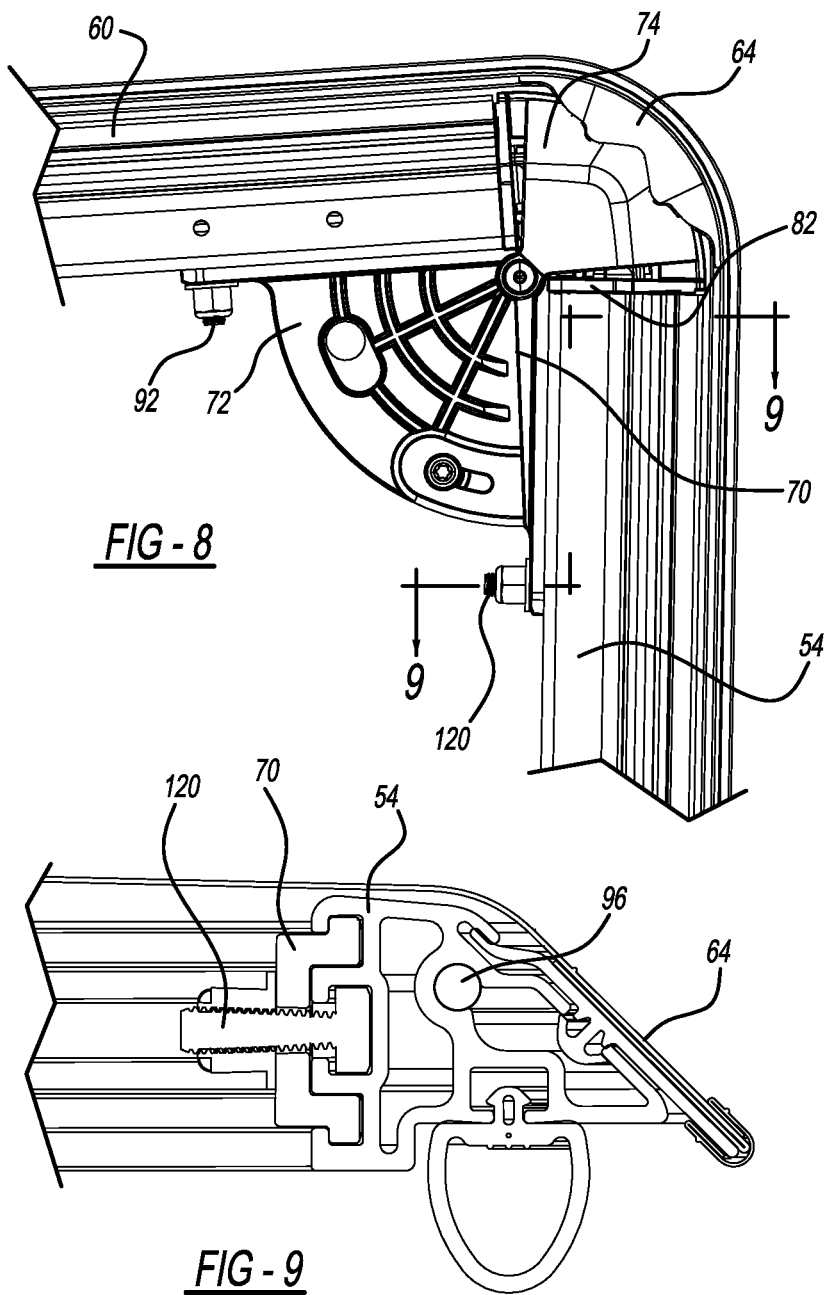

TONNEAU COVER SYSTEM FOR A PICKUP TRUCK BED

CROSS-REFERENCE TO RELATED APPLICATION

The present application claims priority to U.S. Provisional Patent Application Ser. No. 61/663,298, filed Jun. 22, 2012, which is incorporated by reference herein.

BACKGROUND AND SUMMARY

The present disclosure relates generally to a tonneau cover system for a vehicle bed and more particularly to an adjustable corner mechanism for a tonneau cover system capable of accommodating both square and non-square pickup truck beds.

Pickup trucks are used to haul various items, such as business merchandise, camping equipment, and furniture. It is sometimes necessary to transport this cargo under cover (e.g., to protect against theft or inclement weather), while still allowing for large cargo that extends upwardly past the side rails of the pickup. Furthermore, pickup truck beds can be prone to reduced fuel economy when uncovered due to drag created by the tailgate and airflow through the open truck bed. Accordingly, it is known to employ a removable tonneau cover system over a pickup truck bed in order to protect bed contents (e.g., from inclement weather and/or theft) and to reduce vehicle drag for improved fuel economy.

In the prior art, pickup truck beds have been covered by a tonneau-type cover either attached to the sidewalls of the truck bed or secured to a portion of the vehicle cab. Exemplary tonneau cover systems are disclosed in U.S. Pat. No. 5,636,893 entitled "Folding Hard Panel Tonneau Cover With Rail Attachment" which issued to Wheatley et al. on Jun. 10, 1997; U.S. Pat. No. 7,021,693 entitled "Pickup Bed Cover" which issued to Keller on Apr. 4, 2006; and U.S. Pat. No. 7,188,888 entitled "Tonneau System Latch" which issued to Wheatley et al. on Mar. 13, 2007. These patents are incorporated by reference herein. The tonneau covers described in these patents fail to include any mechanism or device for securing the cover at the corners of the pickup truck bed when the bed is non-square.

In accordance with the present invention, a pickup truck bed tonneau cover system is provided. In another aspect, the pickup truck bed tonneau cover system has an adjustable corner bracket assembly. In another aspect, the corner bracket assembly is movable between an acute rail configuration and an obtuse rail configuration. In yet another aspect of the present invention, the corner bracket assembly includes a riveted shear pin.

The present tonneau cover system and its assembly onto a pickup truck bed are advantageous over prior truck bed tonneau cover systems. For example, the present system and method advantageously reduce the number of parts needed for alternate designs. Notably, different vehicle bed lengths and shapes can be accommodated with the same tooling. Additional advantages and features of the present invention will be found in the following description and accompanying claims, as well as in the appended drawings.

BRIEF DESCRIPTION OF THE DRAWINGS

FIG. 2 is a schematic top plan view of a pickup truck bed when the pickup truck has a standard cabin construction;

FIG. 3 is a schematic top plan view of a pickup truck bed when the pickup truck has an extended cabin construction;

FIG. 4 is a schematic top plan view of a pickup truck bed when the pickup truck has an intermediate cabin construction;

FIG. 8 is a top plan view of the corner bracket assembly as installed on a pickup truck bed having an acute rail configuration;

FIG. 9 is a sectional view taken along line 9-9 of FIG. 8;

Corresponding reference numerals indicate corresponding parts throughout the several views of the drawings.

DETAILED DESCRIPTION

The preferred embodiment of a pickup truck bed tonneau cover system 10 is illustrated and described with respect to FIGS. 1 through 16. System 10, as described herein, is designed to fit multiple pickup truck bed arrangements. For example, system 10 may fit pickup truck beds having various shapes (e.g., rectangular and trapezoidal) and sizes. Accordingly, a reduced number of parts and tooling may be needed for production of the multiplicity of tonneau cover systems 10.

Figure 1:
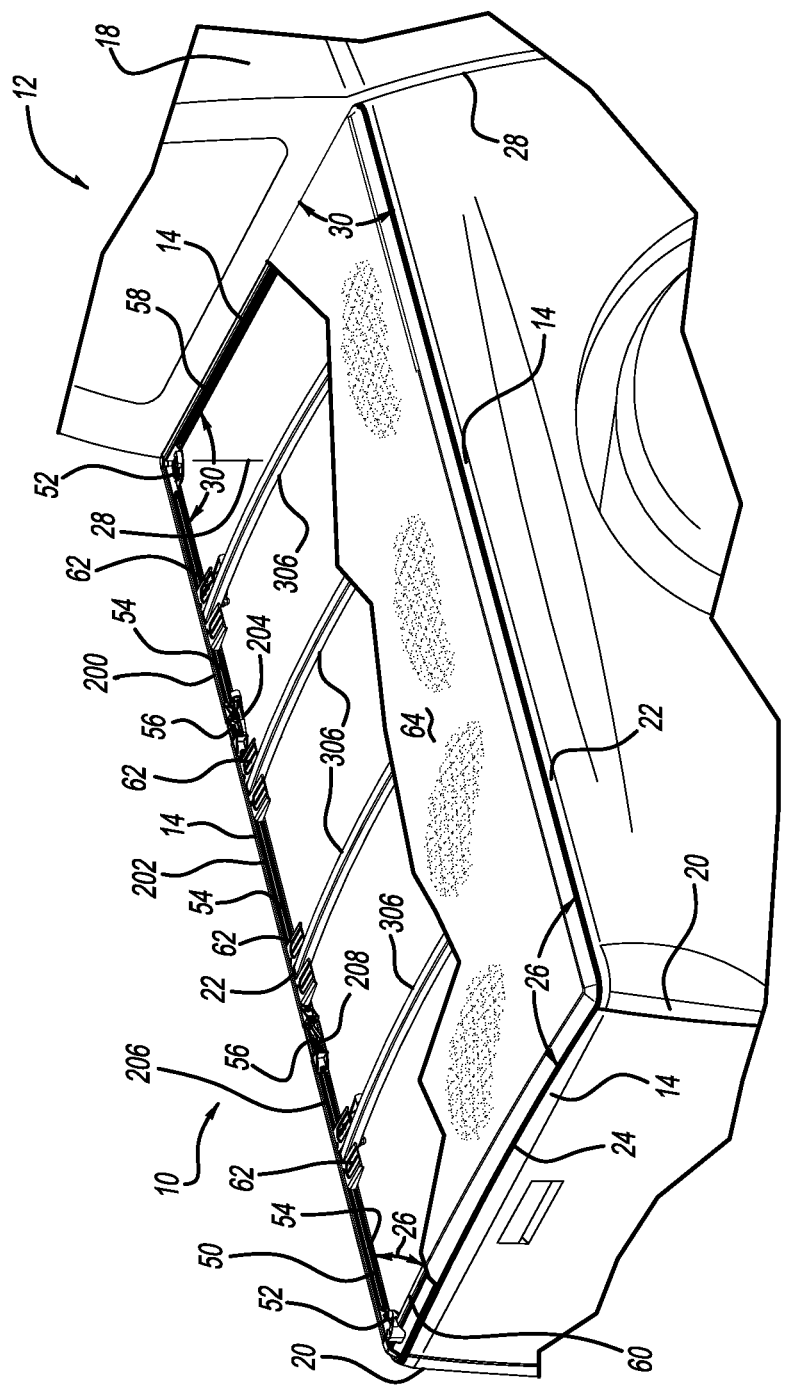
FIG. 1 is a partial perspective view of a pickup truck bed including a partially cut-away tonneau cover system according to the present disclosure.
Figure 5:
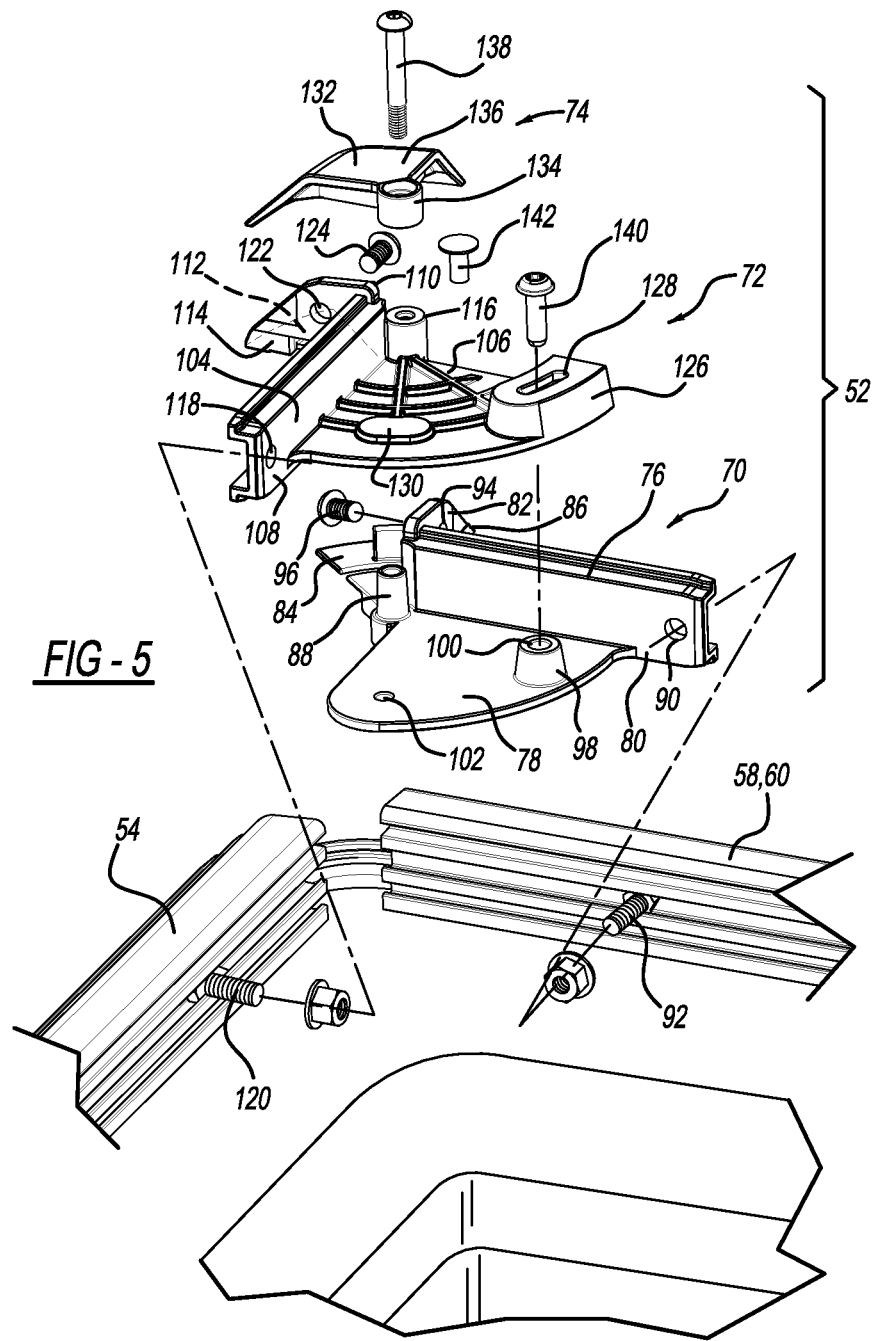
FIG. 5 is an exploded view of a corner bracket assembly of the tonneau cover system of FIG. 1.

With reference now to FIG. 1, a vehicle, such as a pickup truck 12, includes a generally rectangular truck bed 14. Typically, truck bed 14 is substantially rectangular with each of the mating lengths having an inclusive angle of approximately ninety degrees (90°). However, truck bed 14 may also be slightly trapezoidal in nature to accommodate different cabin 18 lengths. For example, corners 20 of truck bed 14 between side walls 22 and tailgate 24 have an acute inclusive angle 26 (e.g., less than ninety degrees), while corners 28 of truck bed 14 between side walls 22 and cabin 18 have an obtuse inclusive angle 30 (e.g., greater than ninety degrees).

Examples of trapezoidal bed configurations are illustrated in FIGS. 2-4, where FIG. 2 shows a standard cabin construction 32, FIG. 3 shows an extended cabin construction 34, and FIG. 4 shows an intermediate cabin construction 36. The trapezoidal inclusive angles 26, 30 typically range ±2 degrees or less from a right angle (e.g., 90 degrees); therefore, the overall generally rectangular shape of truck bed 14 is still generally maintained. Furthermore, even with the addition of a toolbox accessory 38, such as shown with standard cabin construction 32, a new inclusive angle 40 between side walls 22 and toolbox accessory 38 still falls within the prior angular variance.

With continued reference to FIG. 1, tonneau cover system 10 is arranged on pickup truck 12 and includes a frame 50 generally corresponding in shape and size to truck bed 14. Frame 50 includes a plurality of corner bracket assemblies 52, a plurality of side rails 54 coupled together via a plurality of hinge assemblies 56, a front rail 58, a rear rail 60, and a plurality of cross-car rail brackets 62. Tonneau cover system 10 also includes a flexible fabric 64 that extends over frame 50 and is coupled thereto. For example, flexible fabric 64 may incorporate a retaining device (not shown), such as through adhesive joining or sewing, that is securely received by frame 50 (e.g., a barb and slot arrangement). Flexible fabric 64 may be any fabric having a resistance to abrasion, tearing, and external elements, such as a leather, a vinyl, or a polyvinyl chloride-coated (PVC) material.

Referring now to FIGS. 5-9, corner bracket assembly 52 is used to join one of the side rails 54 to either front rail 58 or rear rail 60. As previously noted, corners 20, 28 of truck bed 14 may have either an acute or obtuse inclusive angle. Similarly, corner bracket assembly 52 is arranged to accommodate either the obtuse or acute configuration of side rails 54 connected to front or rear rail 58, 60, respectively. Accordingly, corner bracket assembly 52 includes a lower bracket member 70, an upper bracket member 72, and a cap member 74. In the example shown in FIGS. 6 and 7, lower bracket member 70 is secured to an end front rail 58, while upper bracket member 72 is secured to an end of one of the side rails 54. In the example shown in FIG. 8, lower bracket member 70 is secured to and end of one of the side rails 54, while upper bracket member 72 is secured to an end of rear rail 60.

Figure 6:
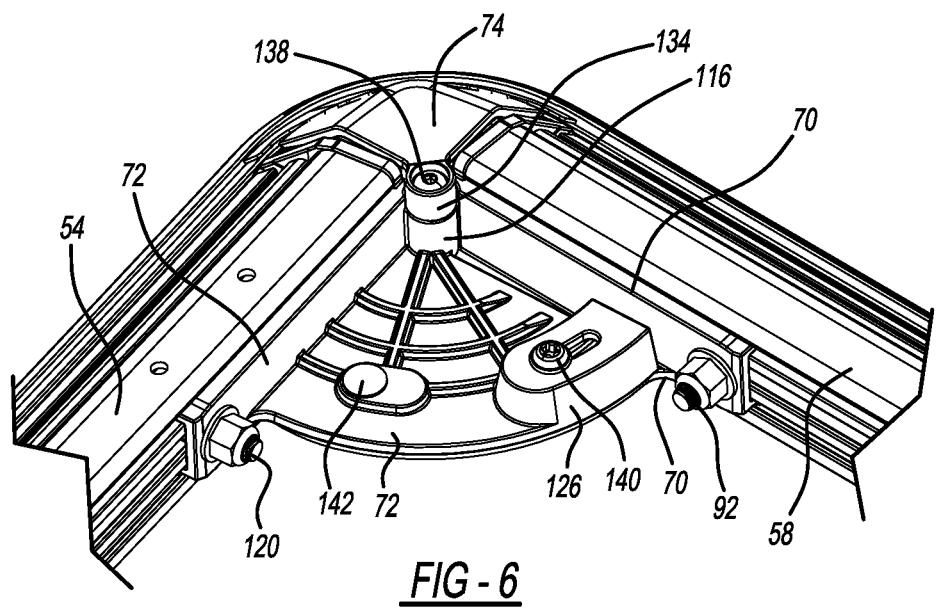
FIG. 6 is a perspective view of the corner bracket assembly as viewed from inside a frame of the tonneau cover system installed on a pickup truck bed having an obtuse rail configuration.
Figure 7:
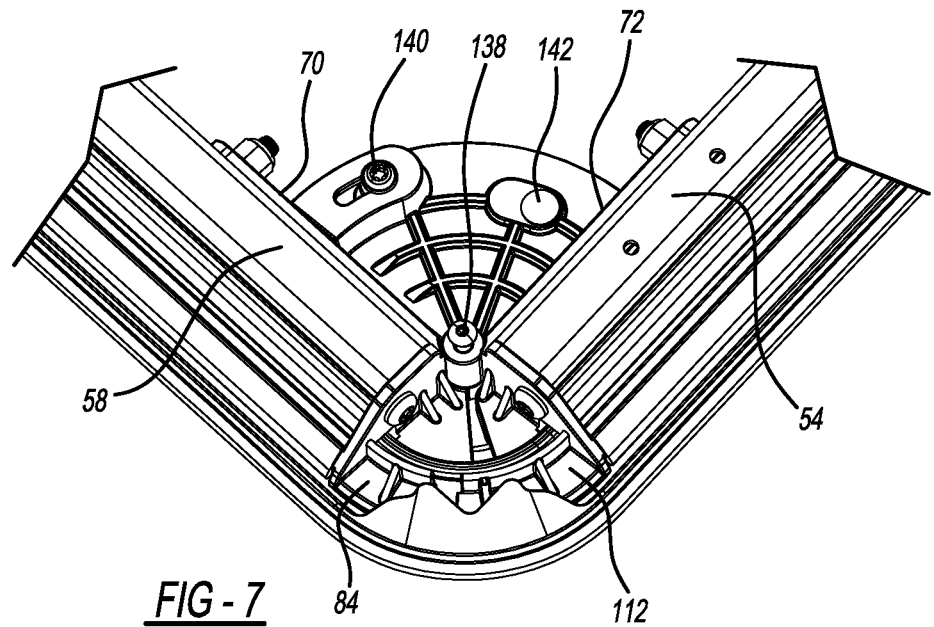
FIG. 7 is a perspective view of the corner bracket assembly, having a cap member partially cut-away, as viewed from outside the frame of the tonneau cover system.

The components of corner bracket assembly 52 will now be described with respect to the arrangement shown in FIGS. 6 and 7; however, it should be understood that corner bracket assembly 52 can be arranged elsewhere within frame 50. With continued reference to FIG. 5, lower bracket member 70 is defined by an elongated arm 76 having a fin plate 78 extending from a lower end 80 thereof, a flange 82 extending transversely from elongated arm 76 and having a radial plate 84 extending from a lower end 86 thereof, and a central pivot member 88 arranged between elongated arm 76 and flange 82. Elongated arm 76 has an aperture 90 arranged along its length for receipt of a fastener 92 extending from front rail 58. Fastener 92 is slidable along front rail 58 for obtaining an appropriate location for attachment to aperture 90. Flange 82 also includes an aperture 94 for receipt of a fastener 96. Fastener 96, however, is inserted through flange 82 so as to seat in an end face of front rail 58. Fin plate 78 includes a boss 98 having an aperture 100 extending therethrough and an aperture 102 radially offset from aperture 100.

Upper bracket member 72 is also defined by an elongated arm 104 having a fin plate 106 extending from a lower end 108 thereof, a flange 110 extending transversely from elongated arm 104 and having a radial plate 112 extending from a lower end 114 thereof, and a central pivot member 116 arranged between elongated arm 104 and flange 110. Elongated arm 104 has an aperture 118 arranged along its length for receipt of a fastener 120 extending from side rail 54. Fastener 120 is slidable along side rail 54 for obtaining an appropriate location for attachment to aperture 118. Flange 110 also includes an aperture 122 for receipt of a fastener 124.

Fastener 124, however, is inserted through flange 110 so as to seat in an end face of side rail 54. Fin plate 106 includes a raised channel 126 having an elongated slot 128 extending therethrough and a reinforced portion 130 radially offset from slot 128.

Cap member 74 is defined by an extending and angled flange member 132 and a central pivot member 134. Flange member 132 extends outwardly from pivot member 134 so as to have a pie-shaped body 136. Pie-shaped body 136 extends outwardly so as to be less than ninety degrees.

In use, upper bracket member 72 is arranged over lower bracket member 70 by aligning pivot member 116 over pivot member 88. In this way, boss 98 is aligned within channel 126 and reinforced portion 130 is aligned over aperture 102. Pivot member 134 of cap member 74 is then aligned over both pivot members 88, 116 so as to cover both radial plates 84, 112. A fastener 138 is secured through pivot members 88, 116, 134 to maintain their fit and alignment. Notably, lower bracket member 70 and upper bracket member 72 may be rotated to any angular relationship. For example, lower bracket member 70 and upper bracket member 72 may be rotated along pivots members 88, 116 to span an inclusive angle of approximately 85° to approximately 95°, and more particularly an inclusive angle of approximately 88° to approximately 92°.

After lower bracket member 70, upper bracket member 72, and cap member 74 are secured with fastener 138, an additional fastener 140 are arranged through elongated slot 128 so as to extend through aperture 100 of boss 98. A rivet 142 is then driven through reinforced portion 130 and aperture 102. Rivet 142 may behave as a shear pin so as to lock lower bracket member 70 and upper bracket member 72 in position, but to fail at a predetermined load before allowing the failure of other componentry of corner bracket assembly 52.

With reference now to FIGS. 8 and 9, corner bracket assembly 52 is secured within all corners of frame 50 in a manner similar to that described above. In particular, lower bracket member 70 is secured to side rail 54 with fastener 120 extending outwardly from side rail 54 (FIG. 9). As can be seen, arm 76 of lower bracket member 70 may also have a contoured profile shape 144 so as to be slidable within side rail 54 to further improve alignment and retention. Fastener 96 secures flange 82 to the end face of side rail 54, as previously described. Likewise, upper bracket member 72 is secured to rear rail 60 with fastener 92 extending outwardly from rear rail 60. Arm 104 of upper bracket member 72 may also have a contoured profile shape (not shown) so as to be slidable within rear rail 60 to further improve alignment and retention. Fastener 124 secures flange 110 to the end face of rear rail 60, as previously described. After all corner bracket assemblies 52 are secured within corners of frame 50, flexible fabric 64 is stretched over frame 50 so as to be secured over cap member 74.

With reference now to FIGS. 10-13, frame 50 includes other features for adapting to non-rectangular truck beds 14. In particular, side rails 54 extending along the lateral sides of truck bed 14 include a first sub-rail 200 near cabin 18, a second sub-rail 202 coupled to first sub-rail 200 via fore hinge assembly 204, and a third sub-rail 206 coupled to second sub-rail 202 via an aft hinge assembly 208 (see FIG. 1). Sub-rails 200, 202, 206 (collectively, side rails 54) along with hinge assemblies 204, 208 (collectively, hinge assemblies 56) permit tonneau cover system 10 to be manually folded in a tri-fold configuration, as will be described in more detail below.

Figure 10:
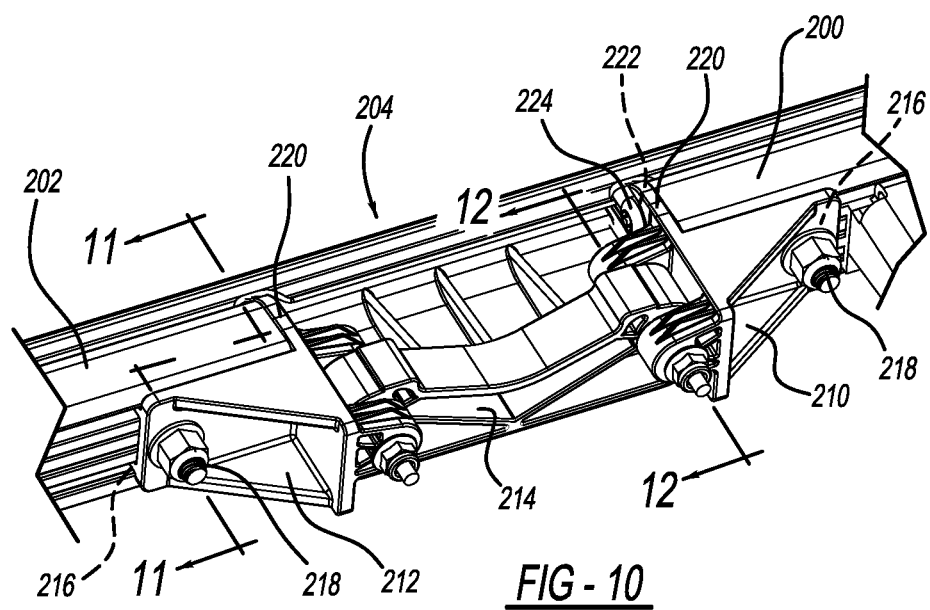
FIG. 10 is an enlarged perspective view of a fore hinge assembly coupled to a side rail of the pickup truck bed tonneau cover system of FIG. 1.
Figure 11:
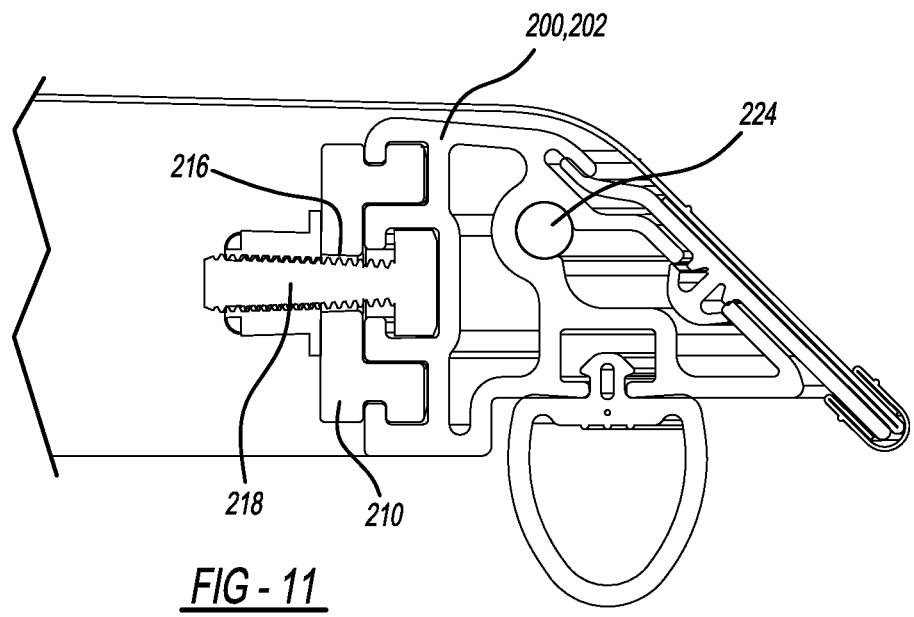
FIG. 11 is a sectional view taken along line 11-11 of FIG. 10.

With particular reference to FIG. 10, fore hinge assembly 204 includes a first attachment bracket 210 for securing hinge assembly 204 to first sub-rail 200, a second attachment bracket 212 for securing hinge assembly 204 to second sub-rail 202, and a spacer 214 for allowing sections of tonneau cover system 10 to fold appropriately. First and second attachment brackets 210, 212 each have an aperture 216 arranged along their length for receipt of a fastener 218 extending from first sub-rail 200 and second sub-rail 202, respectively (as best seen in FIG. 11). Fasteners 218 are slidable along sub-rails 200, 202 for obtaining an appropriate location for attachment to apertures 216. As can be seen, attachment brackets 210, 212 may also have a contoured profile shape so as to be slidable within sub-rails 200, 202 to further improve alignment and retention. First and second attachment brackets 210, 212 also include a flange plate 220 for attachment to end faces of sub-rails 200, 202. In particular, flange plates 220 each include an aperture 222 for receipt of a fastener 224. Fastener 224, however, is inserted through flange plate 220 so as to seat in an end face of sub-rails 200, 202.

Figure 12:
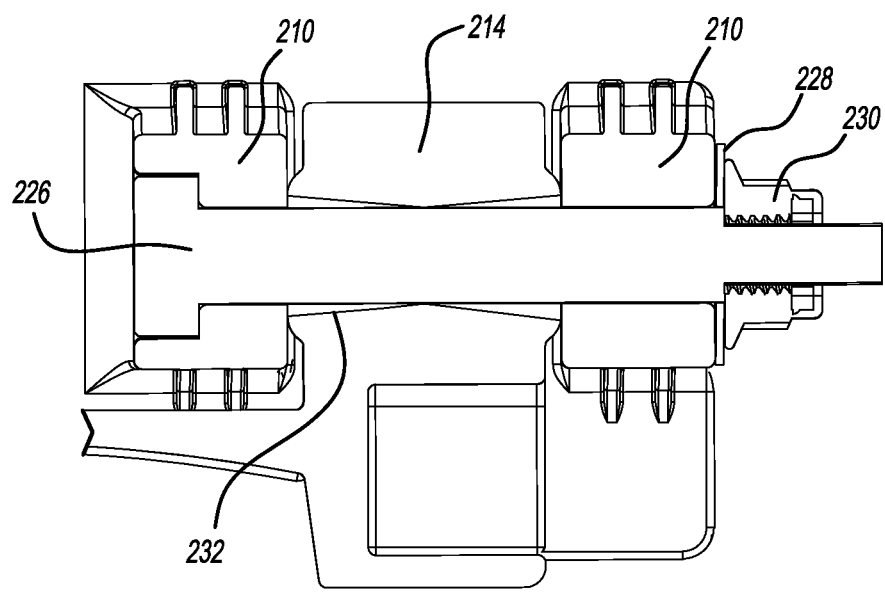
FIG. 12 is a cross-sectional view taken along line 12-12 of FIG. 10, including a contoured profile having an hourglass shape that has been exaggerated for illustrational purposes.

Spacer 214 is sized to allow side-rails 200, 202 to bend freely and seat above one another. As tonneau cover system 10 is shown in a tri-fold configuration, spacer 214 is sized to allow two sections (i.e., both second sub-rail 202 and third sub-rail 206) to fold over top of the section represented by first sub-rail 200. Accordingly, spacer 214 is approximately 77 mm (pivot-to-pivot) in length. Spacer 214 is joined to both first and second attachment brackets 210, 212 at opposing ends thereof. In particular and as shown in FIG. 12, a fastener 226 is arranged so as to extend through a first portion of attachment bracket 210 (or similarly attachment bracket 212), spacer 214, and a second portion of attachment bracket 210, respectively. Fastener 226 is secured with a washer 228 and a nut 230. Spacer 214 includes a contoured profile 232 (e.g., an hourglass shape) aligned with a central portion of fastener 226 so as to allow fastener 226 to act as a ball joint within spacer 214. In this way, fore hinge assembly 204 accommodates any offset in frame 50 due to a non-rectangular truck bed 14.

Figure 13:
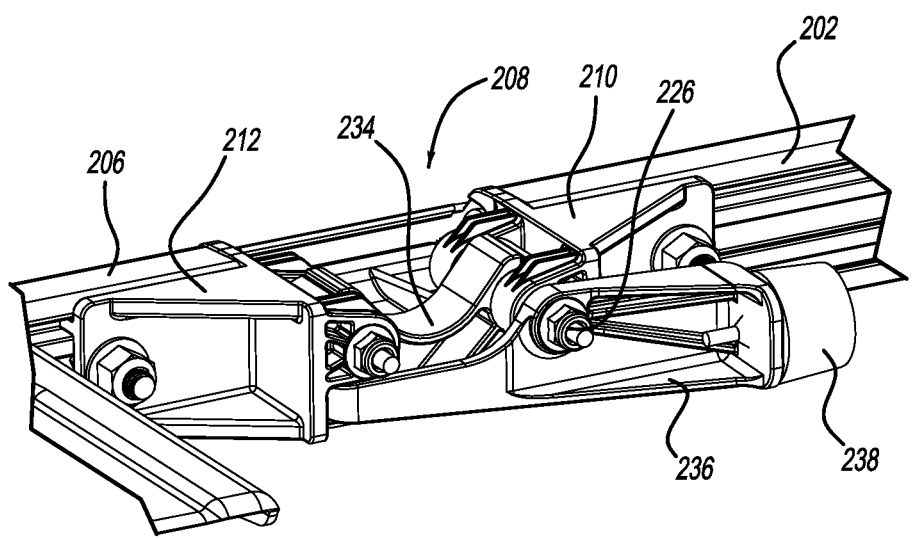
FIG. 13 is an enlarged perspective view of an aft hinge assembly coupled to the side rail of the pickup truck bed tonneau cover system of FIG. 1.

Referring now to FIG. 13, fore and aft hinge assemblies 204, 208 are substantially similar, and therefore, a detailed description of aft hinge assembly 208 is forgone. However, aft hinge assembly 208 is arranged between second sub-rail 202 and third sub-rail 206. As such, a spacer 234 of aft hinge assembly 208 is substantially smaller than spacer 214 of fore hinge assembly 204. Spacer 234 is sized to allow only side-rails 202, 206 to bend freely and seat above one another. Accordingly, spacer 234 is approximately 42 mm (pivot-to-pivot) in length. Spacer 234 is joined to both first and second attachment brackets 210, 212, as previously described. Spacer 234 also includes contoured profile 232 (e.g., an hourglass shape) so as to allow fastener 226 to act as a ball joint within spacer 234.

While substantially similar to fore hinge assembly 204, aft hinge assembly 208 also includes a support member, or kickstand 236. Kickstand 236 is secured to fastener 226, but is rotatable therewith. Kickstand 236 is arranged so as to be in a horizontal, stowed position when tonneau cover system 10 is unfolded, but is rotated to a vertical, use position when tonneau cover system 10 is tri-folded. Kickstand 236 includes a polymer bumper 238, which contacts the third section (e.g., at first sub-rail 200) during folding. In this way, wear and tear of flexible fabric 64 is reduced during folding.

Figure 14:
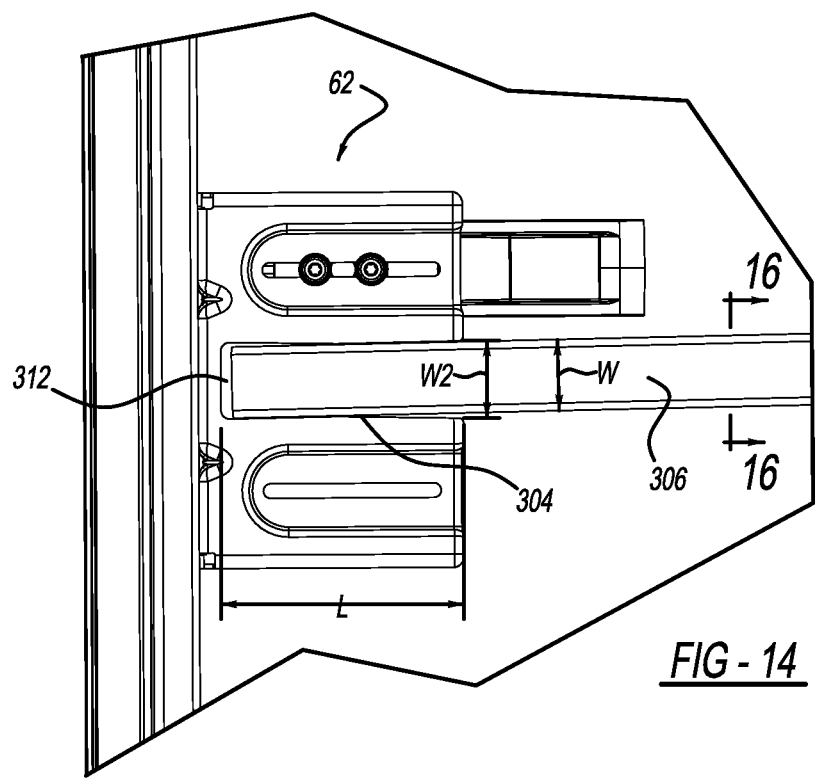
FIG. 14 is an enlarged top plan view of a cross-car rail bracket secured to the side rail of the pickup truck bed.
Figure 16:
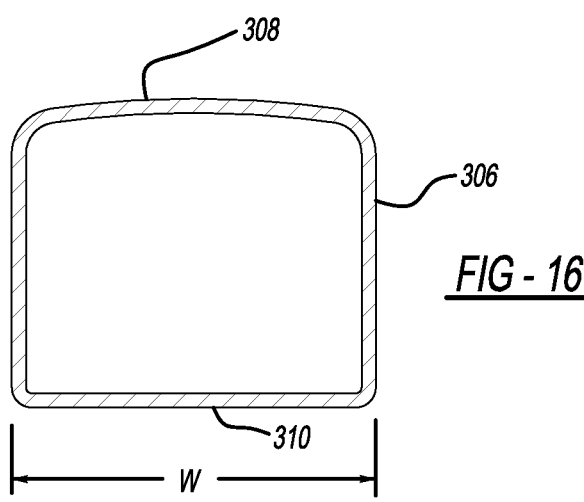
FIG. 16 is a cross-sectional view taken along line 16-16 of FIG. 14.
Figure 15:
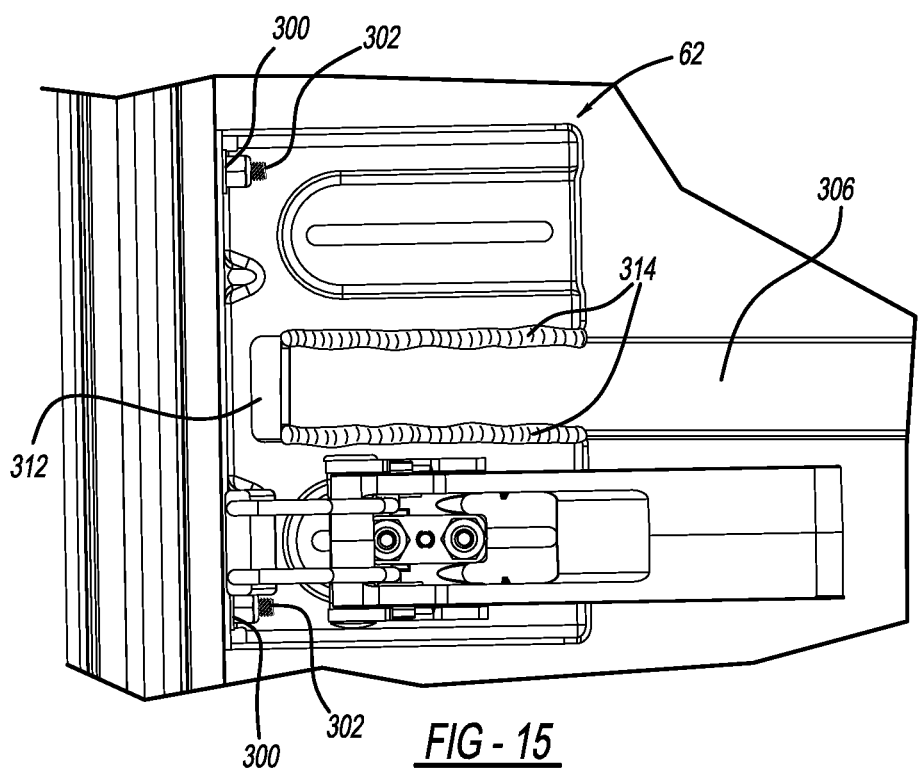
FIG. 15 is an enlarged bottom plan view of the cross-car rail bracket of FIG. 14.

With reference now to FIGS. 14-16, additional features for adapting frame 50 to non-rectangular truck beds 14 are shown. Cross-car rail brackets 62 are arranged in pairs and coupled to opposing sides of frame 50. Each bracket 62 includes apertures 300 through which fasteners 302 extend. In particular, fasteners 302 are captured in a T-shaped channel of side rails 54 so as to extend through apertures 300 of bracket 62.

Cross-car rail brackets 62 can have a stamped metal construction and a symmetrical configuration to permit use along either side and at any position within frame 50. Brackets 62 also include a main recess 304 into which an end of a cross-car bow 306 is received. Cross-car bow 306 spans between and is coupled to side rails 54 via each pair of cross-car rail brackets 62 at opposing ends of cross-car bow 306. Each cross-car bow 306 has an upwardly bowed configuration over its length. In addition, a cross-section of the cross-car bow 306 has a curved upper surface 308 and a flat bottom surface 310 as particularly illustrated in FIG. 16. Cross-car bows 306 and frame 50 (i.e., rails 54, 58, 60) can have an extruded metal construction. In some cases, cross-car bows 306 are preferably formed from an aluminum, an aluminum metal alloy (e.g., AA6063-T5 aluminum alloy), or a steel.

Main recess 304 is sized for receipt of cross-car bow 306; however, main recess 304 is provided with a predetermined gap 312 so as to allow cross-car bow 306 to be movable in main recess 304 during manufacture. In particular, while cross-car bow 306 has a width W, for example, of approximately 27 mm, predetermined gap 312 has a width W2, for example, of approximately 34.5 mm. In this way, cross-car bow 306 may be angled within main recess 304 to accommodate a non-rectangular truck bed 14. Furthermore, it is contemplated that a single length cross-car bow 306 may be used in multiple or in all locations of frame 50, as cross-car bow 306 may be slidable along a length L of bracket 62. After a final arrangement of cross-car bow 306 within gap 312 is achieved, cross-car bow 306 may be welded into bracket 62 (e.g., weld 314) to secure the position thereto. Notably, while recess 304 is described as having a common width W2 along its length, it is also contemplated that recess 304 may have an hourglass shape. In this arrangement, the hourglass shape of recess 304 may extend approximately two degrees outwardly from a central location along the length L of the recess 304.

Additional applications filed on this same date contain information related to the above disclosure. These are U.S. patent application Ser. No. 13/538,049, entitled "TONNEAU COVER APPARATUS FOR A PICKUP TRUCK BED"; U.S. patent application Ser. No. 13/538,005, entitled "TONNEAU COVER FRAME FOR A PICKUP TRUCK BED"; U.S. patent application Ser. No. 13/538,149, entitled "TONNEAU COVER ASSEMBLY FOR A PICKUP TRUCK BED"; and U.S. patent application Ser. No. 13/538,240, entitled "PICKUP TRUCK BED TONNEAU COVER SUPPORT STRUCTURE AND METHOD"; each of which has a filing date of Jun. 29, 2012. The entire disclosures of each of the above applications are incorporated herein by reference.

The foregoing description of the embodiments has been provided for purposes of illustration and description. It is not intended to be exhaustive or to limit the disclosure. For example, while a pickup truck is shown, other vehicles having a bed can also be employed (e.g., an SUV). Furthermore, while described as a flexible fabric material, it should be understood that system 10 may also be applicable to other covering arrangements, such as, a hard cover material. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pickup truck bed tonneau cover system comprising:
   a frame substantially corresponding to a shape and size of a pickup truck bed comprising:
      a front rail member;
      a rear rail member opposing the front rail member;
      a pair of side rail members extending between the front and rear rail members;
      a corner bracket assembly secured to one of the side rails and one of the front and rear rail members, the corner bracket assembly having a first bracket member, a second bracket member, and a cap member, wherein the first and second bracket members are pivotally joined and fixedly secured together with a fastener at a selected corner angle; and
   a fabric arranged over the frame and secured to the corner bracket assembly at the cap member; and the cap member securing the fabric at an undersurface thereof.

2. The pickup truck bed tonneau cover system of claim 1, wherein the first bracket member has a first fin plate extending from a lower portion thereof and the second bracket member has a second fin plate extending from a lower portion thereof.

3. The pickup truck bed tonneau cover system of claim 2, wherein the first fin plate has an extending boss and the second fin plate has a raised channel receiving the extending boss of the first fin plate.

4. The pickup truck bed tonneau cover system of claim 2, wherein the second fin plate has a reinforced portion for receiving a rivet therethrough.

5. The pickup truck bed tonneau cover system of claim 1, wherein the first bracket member is secured to one of the front and rear rail members and the second bracket member is secured to one of the side rail members adjacent the one of the front and rear rail members.

6. The pickup truck bed tonneau cover system of claim 1, wherein the second bracket member is secured to one of the front and rear rail members and the first bracket member is secured to one of the side rail members adjacent the one of the front and rear rail members.

7. The pickup truck bed tonneau cover system of claim 1, wherein first and second bracket members are coupled to each other in a fixed relationship to provide an acute inclusive angle as the selected corner angle.

8. The pickup truck bed tonneau cover system of claim 1, wherein the first and second bracket members are coupled to each other in a fixed relationship to provide an obtuse inclusive angle as the selected corner angle.

9. The pickup truck bed tonneau cover system of claim 1, wherein each of the first bracket member and the second bracket member include an aperture receiving a fastener extending from one of the front, rear, and side rail members.

10. The pickup truck bed tonneau cover system of claim 1, wherein the first and second bracket members have a contoured profile on an elongated arm so as to be slidably received within a mating profile in a channel of each of the front, rear, and side rail members.

11. A corner bracket assembly for a pickup truck bed tonneau cover system comprising:
    a first bracket member having a first elongate arm member and a first fin plate extending from a lower portion of the first arm member;
    a second bracket member having a second elongate arm member and a second fin plate extending from a lower portion of the second arm member; and
    a cap member pivotally secured to both the first and second bracket members with a pin, wherein a raised channel of the second fin plate at least partially overlaps an extending boss of the first fin plate, and wherein a fastener extends through the raised channel and into the extending boss to positionally secure the first and second bracket members in one of an acute and an obtuse angular relationship.

12. The corner bracket assembly of claim 11, wherein the extending boss is radially movable in the raised channel before being secured by the fastener.

13. The corner bracket assembly of claim 11, wherein the second fin plate has a reinforced portion having a second fastener received therethrough, wherein the second fastener is a shear pin.

14. The corner bracket assembly of claim 11, wherein the arm member of the first bracket member is secured to a first rail member and the arm member of the second bracket member is secured to a second rail member adjacent the first rail member.

15. The corner bracket assembly of claim 11, wherein the acute inclusive angle between the first and second bracket members ranges from approximately 85° to 89°.

16. The corner bracket assembly of claim 11, wherein the obtuse inclusive angle between the first and second bracket members ranges from approximately 91° to 95°.

17. The corner bracket assembly of claim 11, wherein the cap member secures a flexible fabric at an undersurface thereof.

18. The corner bracket assembly of claim 11, wherein the first and second arm members have a contoured profile so as to be slidably received within a mating profile in a channel of a rail member.

19. A corner bracket assembly for a pickup truck bed tonneau cover system comprising:
    a first bracket arm member secured to one of a rear and a front rail of the pickup truck bed tonneau cover system;
    a second bracket arm member secured to a side rail of the pickup truck bed tonneau cover system; and
    a first fastener pivotally joining the first bracket arm member to the second bracket arm member prior to fixedly coupling the first and second bracket arm members with a second fastener, wherein before fixedly coupling the first and second bracket arm members, the first bracket arm member and the second bracket arm member are pivotally movable to form one of an acute inclusive angle therebetween and an obtuse inclusive angle therebetween.

20. The corner bracket assembly of claim 19, wherein the acute inclusive angle ranges from approximately 85° to 89°.

21. The corner bracket assembly of claim 20, wherein the acute inclusive angle is 89°.

22. The corner bracket assembly of claim 19, wherein the obtuse inclusive angle ranges from approximately 91° to 95°.

23. The corner bracket assembly of claim 22, wherein the obtuse inclusive angle is 91°.

24. The corner bracket assembly of claim 19, wherein the first bracket arm member has a first fin plate extending from a lower surface thereof and the second bracket arm member has a second fin plate extending from a lower surface thereof, wherein an extending boss on the first fin plate is received within a raised channel on the second fin plate.

25. The corner bracket assembly of claim 24, wherein a rivet extends through the first and second fin plates and wherein the rivet is a shear pin.

26. The corner bracket assembly of claim 19, further comprising a cap member pivotally secured to the first and second bracket arm members with the fastener.

27. The corner bracket assembly of claim 19, wherein the first and second bracket arm members have a contoured profile so as to be slidably received within a mating profile of the mating rail member.

28. A method of manufacturing a pickup truck bed tonneau cover system comprising:
(a) providing pairs of rail members that substantially correspond in length to adjacent sides of a pickup truck bed;
(b) coupling a first end of one of the rail members to a first bracket member of a corner bracket assembly;
(c) coupling an adjacent end of the other of the rail members to a second bracket member of the corner bracket assembly; and
(d) pivotally coupling the first bracket member to the second bracket member with a fastener such that fins laterally extending from the bracket members overlap each other with the fins spanning between the rail members.

29. The method of claim 28, further comprising:
repeating steps (a) through (d) for each corner of the pickup truck bed.

30. The method of claim 29, further comprising:
riveting each of the first bracket members to the corresponding second bracket member with a shear pin.

31. The method of claim 28, further comprising:
positioning a fabric over the rail members and the corner bracket assemblies; and
covering at least a portion of the fabric at the corner bracket assembly with a cap including a flange having a substantially triangularly shaped top view and a hole near an apex thereof.

32. The method of claim 28, wherein coupling the rail members to the bracket member further comprises:
mating a contoured profile of the bracket member to a contoured profile of the rail member so as to slidably receive the bracket member in the rail member.

33. The method of claim 28, wherein pivotally coupling the first bracket member to the second bracket member further comprises:
pivotally moving the corner bracket assembly to form an acute inclusive angle between the first bracket member and the second bracket member; and
fastening the fins together.

34. The method of claim 28, wherein pivotally coupling the first bracket member to the second bracket member further comprises:
pivotally moving the corner bracket assembly to form an obtuse inclusive angle between the first bracket member and the second bracket member; and
fastening the fins together.

35. A pickup truck bed tonneau cover system comprising:
(a) a frame substantially corresponding to a shape and size of a pickup truck bed comprising:
(i) a front rail member;
(ii) a rear rail member opposing the front rail member;
(iii) a pair of side rail members extending between the front and rear rail members;
(iv) a corner bracket assembly secured to one of the side rails and one of the front and rear rail members, the corner bracket assembly comprising a first bracket member and a second bracket member, the first bracket member including a fin plate extending from a portion thereof and the second bracket member including a fin plate extending from a portion thereof, one of the fin plates including an extending boss and the other of fin plates including a channel receiving the extending boss, the first and second bracket members being pivotally joined and fixedly secured together with a fastener at a selected corner angle; and
(b) fabric arranged over the frame and secured to the corner bracket assembly.

36. The pickup truck bed tonneau cover system of claim 35, wherein the first bracket member is secured to one of the front and rear rail members and the second bracket member is secured to one of the side rail members adjacent the one of the front and rear rail members.

37. The pickup truck bed tonneau cover system of claim 35, wherein first and second bracket members are coupled to each other in a fixed relationship to provide an acute inclusive angle as the selected corner angle, further comprising a cap covering at least a portion of the bracket members, the cap including an offset angled flange having a substantially triangular shaped top view and a hole near an apex thereof.

38. The pickup truck bed tonneau cover system of claim 35, wherein the first and second bracket members are coupled to each other in a fixed relationship to provide an obtuse inclusive angle as the selected corner angle further comprising a cap covering at least a portion of the bracket members, the cap including an offset angled flange having a substantially triangular shaped top view and a hole near an apex thereof.

39. The pickup truck bed tonneau cover system of claim 35, wherein the first and second bracket members have a contoured profile on an elongated arm so as to be slidably recovered within a mating profile in a T-shaped channel of each of the front, rear, and side rail members.

\* \* \* \* \*

UNITED STATES PATENT AND TRADEMARK OFFICE
CERTIFICATE OF CORRECTION

PATENT NO. : 8,702,151 B2  
APPLICATION NO. : 13/537897  
DATED : April 22, 2014  
INVENTOR(S) : Christopher Joseph Mayfield and Bradley R. Garska Page 1 of 1

It is certified that error appears in the above-identified patent and that said Letters Patent is hereby corrected as shown below:

In the Claims

| Issued Patent | | Description of Error |
|---|---|---|
| Column | Line | |
| 10 | 44-45 | In Claim 39, delete "recovered" and insert --received--, therefor |

Signed and Sealed this  
Twenty-third Day of September, 2014

Michelle K. Lee  
*Deputy Director of the United States Patent and Trademark Office*